United States Patent [19]

Kubens

[11] 4,072,649

[45] Feb. 7, 1978

[54] PROCESS FOR THE PRODUCTION OF FOUNDRY CORES AND MOLDS

[75] Inventor: Rolf Kubens, Odenthal-Hahnenberg, Germany

[73] Assignee: Bayer Aktiengesellschaft, Leverkusen, Germany

[21] Appl. No.: 602,949

[22] Filed: Aug. 7, 1975

[30] Foreign Application Priority Data

Aug. 23, 1974 Germany ............................ 2440375

[51] Int. Cl.$^2$ ......................... C08K 3/34; B22C 1/22; B29C 1/02

[52] U.S. Cl. .................................. 260/37 N; 260/38; 260/DIG. 40; 164/43; 264/239; 264/240; 264/219

[58] Field of Search .................. 260/DIG. 40, 37, 38, 260/77.5 AT; 164/43

[56] References Cited

U.S. PATENT DOCUMENTS

| | | | |
|---|---|---|---|
| 3,180,883 | 4/1965 | Case | 260/77.5 AT |
| 3,403,721 | 10/1968 | Robins et al. | 260/DIG. 40 |
| 3,428,110 | 2/1969 | Walker et al. | 260/DIG. 40 |
| 3,499,861 | 3/1970 | Kujawa et al. | 260/25 |
| 3,676,392 | 7/1972 | Robins | 260/DIG. 40 |

OTHER PUBLICATIONS

B. A. Dombrow, Polyurethanes, 2nd edition (1965) pp. 26 & 27.

*Primary Examiner*—Sandra M. Person
*Attorney, Agent, or Firm*—Gene Harsh; Joseph C. Gil; William E. Parry

[57] ABSTRACT

Foundry cores and molds are produced from foundry sand and/or other inert fillers, polyhydroxyl compounds, polyisocyanates and tertiary amine catalysts. The precatalyzed mixtures can be stored for long periods of time without any adverse effects on the subsequent processing or core properties when at least 80% by weight of the polyisocyanate used is of the diphenyl alkane series in which the isocyanate groups are sterically hindered solely by substituents in at least one ortho position.

10 Claims, No Drawings

PROCESS FOR THE PRODUCTION OF FOUNDRY CORES AND MOLDS

BACKGROUND OF THE INVENTION

It is known that foundry molds can be produced from sand, polyhydroxyl compounds and polyisocyanates (see, e.g. U.S. Pat. No. 3,499,861). It is also known that tertiary amines can be used as catalysts for accelerating the hardening of polyurethanes. In one known process for the production of foundry cores, a mixture of sand, polyhydroxyl compound and polyisocyanate is prepared in a storage vessel. The quantity of mixture required for producing the core is transferred to a core mold (core box). A mixture of air and a tertiary amine is subsequently blown through the core mold [R. Nagele: Erfahrungen mit dem Gas-Nebel-Verfahren (cold-box process) zur Kernherstellung, Giesserei, 56 (1969) No. 11, pages 298 et seq.]. Binders which have proved to be particularly suitable for this process include phenol-formaldehyde resins of the novolak type and MDI-isocyanates. Triethyl amine has proved to be a suitable catalyst.

The disadvantage of this process lies in the limited storability of the mixture of sand, polyhydroxyl compound and polyisocyanate. The mixture has a maximum pot life of 1.5 to 2 hours, after which the mechanical strength of the cores produced therefrom decreases drastically so that they can no longer be used. If the mixture is stored in the storage vessel for a prolonged period (for example, overnight or over a non-working day), the mixture hardens. The storage vessel and all those parts of the core-shooting machine which come into contact with the mixture have to then be cleaned by a laborious operation.

DESCRIPTION OF THE INVENTION

It has now been found that the disadvantages referred to above can be obviated where at least 80% of the polyisocyanate component consists of polyisocyanates which have sterically hindered isocyanate groups of the type defined in more detail below.

Accordingly, the invention relates to a process for the production of foundry cores and molds by the cold-box process from foundry sand and/or other inert fillers, polyhydroxyl compounds, polyisocyanates and tertiary amines, characterized in that at least 80% by weight of the polyisocyanates containing isocyanate groups sterically hindered solely by substituents in at least one ortho position.

The mixture of foundry sand and/or other inert fillers, polyhydroxyl compounds and the polyisocyanates of the invention have a shelf life of several days in the absence of the tertiary amines without any reduction in the mechanical strength of the cores or any decrease in the fluidity of the mixture. Following the addition of tertiary amines, the mixtures harden in a few seconds to form foundry cores of high mechanical strength. This is virtually the same hardening time as it takes for mixtures conventionally prepared from sand, polyhydroxyl compounds and MDI-polyisocyanates, which have a service life of only a few hours. This discovery is completely surprising because diisocyanates containing sterically hindered isocyanate groups, such as 3,3'-dimethyl-4,4'-diisocyanato-diphenyl methane, are known to show a greater reluctance to react because of the steric hindering of the isocyanate groups.

At least 80% by weight and preferably at least 90% by weight of the isocyanate component used in the process of the invention consists of polyisocyanates of the diphenyl alkane series having isocyanate groups which are sterically hindered by substituents in the ortho position.

Polyisocyanates of this kind include polyisocyanates such as

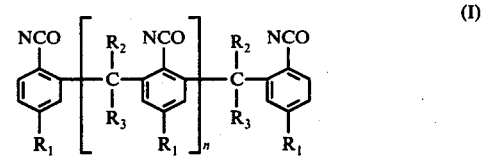

(I)

and

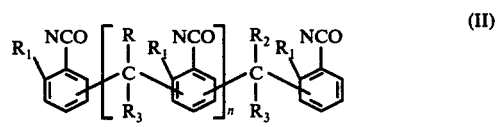

(II)

In both the above formulae, $R_1$ represents an aliphatic hydrocarbon radical having from 1 to 4 carbon atoms, $R_2$ and $R_3$ are the same or different and represent hydrogen or the radical $R_1$, and $n$ is 0 or an integer from 1 to 8.

Polyisocyanates of formulae I, and II, in which $R_1$ represents a methyl group, $R_2$ and $R_3$ represent hydrogen and $n$ is 0 or an integer from 1 to 3, are preferably used in the process according to the invention.

It is also, of course, possible to use mixtures of polyisocyanates I and II.

These polyisocyanates are generally known and are produced by the well known process of condensing amines such as

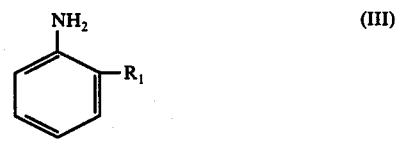

(III)

and/or

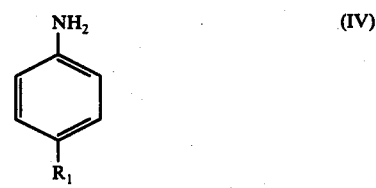

(IV)

with aldehydes or ketones such as

(V)

in the presence of acid catalysts, followed by phosgenation of the resulting condensation product.

Examples of suitable polyisocyanates of formula I include 2,2'-diisocyanato-5,5'-dimethyl diphenyl methane and its higher homologues ($n$ = 1–8 preferably 1–3) and 2,2'-diisocyanato-5,5'-dimethyl-2,2-diphenyl propane and its higher homologues ($n = 1-8$, preferably 1-3).

Examples of suitable polyisocyanates of formula II include 4,4'-diisocyanato-3,3'-dimethyl diphenyl methane and its higher homologues ($n = 1-8$ preferably 1-3); 2,4'-diisocyanato-3,3'-dimethyl diisocyanatodiphenyl methane and its higher homologues; 4,4'-diisocyanato-3,3'-di-tert.-butyl diphenyl methane and its higher homologues; 4,4'-diisocyanato-3,3'-diethyl diphenyl methane and its higher homologues; and 4,4'-diisocyanato-3,3'-dimethyl-2,2-diphenyl propane and its higher homologues.

The polyisocyanate particularly preferred is 4,4'-diisocyanato-3,3'-dimethyl diphenyl methane.

The polyisocyanates of the invention may be used in admixture with up to 20% by weight but preferably with only up to 10% by weight, based on the total isocyanate component of known aromatic polyisocyanates having sterically unhindered isocyanate groups, especially 4,4'-diisocyanatodiphenyl methane and/or its higher homologues.

Polyhydroxyl compounds suitable for use in the process of the invention include compounds such as the known polyhydroxy polyesters having OH-numbers in the range from 100 to 1800, preferably from 150 to 650. These are generally obtained by reacting aliphatic or aromatic dicarboxylic acids, such as, adipic acid and/or phthalic acid, with excess quantities of aliphatic polyhydroxyl compounds having molecular weights in the range from 62 to 200, such as ethylene glycol, hexamethylene glycol, diethylene glycol, trimethylol propane and/or glycerol.

Other polyhydroxyl compounds suitable for use in the process of the invention include the known polyhydroxy polyethers having OH-numbers in the range from 100 to 1800, preferably from 150 to 650. These are generally obtained by the alkoxylation with ethylene oxide and/or propylene oxide of suitable, more highly functional polyhydroxyl compounds which are preferably nitrogen-free. Starter compounds of this kind include water, ethylene glycol, 1,2-propane diol, 1,3-propane diol, trimethylol propane, glycerol, pentaerythritol, and/or cane sugar.

The polyhydroxyl compounds preferably used in the process of the invention are phenol resins containing hydroxyl groups. Such resins are obtained by the acid or alkaline condensation of phenols with formaldehyde and may be produced by the process described in U.S. Pat. No. 3,499,861, Column 2, line 43 to Column 4, line 13.

Phenol resins whose phenol hydroxyl groups have been converted by hydroxy alkylation into aliphatic hydroxyl groups or which have been produced from hydroxy alkylated phenols are also described in U.S. Pat. No. 3,499,861. These may also be used in the process of the invention.

Other polyhydroxyl compounds suitable for use in the process of the invention include polyols of the formula

$$R(OH)_m$$

in which

R represents an aliphatic hydrocarbon radical having 2 to 6 carbon atoms or a cycloaliphatic hydrocarbon radical having 5 to 15 carbon atoms.

Examples of polyols of this kind include ethylene glycol, 1,2-propane diol, 1,3-propane diol, 1,4-butane diol, 1,6-hexane diol, trimethylol propane, glycerol, 1,4-dihydroxy cyclohexane, 4,4'-dihydroxy dicyclohexyl methane or 4,4'-dihydroxy-2,2-dicyclohexyl propane.

Mixtures of the aforementioned polyhydroxyl compounds may also be used.

Fillers suitable for use in the process according to the invention, apart from the foundry sand preferably used, include any inert fillers such as, aluminum oxide, iron oxide and basalt gravel.

To carry out the process of the invention, it is preferred to mix solutions of the polyisocyanate component and polyhydroxyl component in inert solvents such as ethyl acetate, isobutyl acetate, methyl ethyl ketone, methyl isobutyl ketone, toluene or xylene. The quantitative ratios between the reactants are selected to give an NCO:OH-ratio of from 2:1 to 1:2 and preferably 1:1. This solution is subsequently mixed with the filler, preferably foundry sand. 1000 to 100,000 parts by weight and preferably 3000 to 20,000 parts by weight of filler are used per 100 parts by weight of polyurethane-forming mixture (polyisocyanate + polyhydroxyl compound).

The mixture thus obtained is shaped into the required core mold and preferably consolidated by tamping.

The mold thus obtained is preferably hardened by exposure to air to which the tertiary amine catalyst has been added. Suitable catalysts include any gaseous or readily volatile tertiary amines such as, trimethyl amine, triethyl amine or triethylene diamine.

The invention is further illustrated but is not intended to be limited by the following examples in which all parts and percentages are by weight unless otherwise specified.

EXAMPLE 1

100 parts by weight of a novolak produced by acid condensation (HCl as catalyst) from phenol and formaldehyde in a molar ratio of 1:0.8, having an OH content of 16% a softening point of 120° C and an average molecular weight of 950 are dissolved in 50 g of butyl acetate.

140 parts by weight of 4,4'-diisocyanato-3,3'-dimethyl diphenyl methane having an NCO content of 30% are dissolved in 70 g of butyl acetate. Both solutions are combined and mixed by stirring with 20,000 parts by weight of foundry sand having an average grain size of 0.5 mm. A free-flowing sand mixture is obtained and may be processed in core-shooting machines or tamped by hand to form foundry cores or molds.

A portion of the mixture is poured into a metal core mold having a 4 × 3 × 16 cm mold cavity, and is consolidated by tamping with a wooden pestle under a pressure of 1 kp/cm². The base of the mold is formed with inlet openings covered by sieve plates which retain the wet sand but allow gases through. There are similar openings at the upper end of the mold.

After the mold has been closed, compressed air is blown through under a pressure of 3 kp/cm². 0.5 g of triethyl amine are added to the compressed air within the first 3 seconds being sprayed into the air line preceding the inlet opening into the mold by means of a piston metering pump. The period of time required to obtain complete hardening of the sand core is 10 seconds. The core thus obtained has a flexural strength according to DIN 1048 of 31 kp/cm².

After storage for 5 days in a closed vessel, the rest of the mixture has lost none of its fluidity. The hardening time and core strength remain unchanged at 10 seconds and 31 kp/cm² respectively.

When the procedure described above is repeated with 125 parts by weight of 4,4'-diisocyanatodiphenyl methane having an NCO-content of 33.7% instead of 140 parts by weight of the above-mentioned diisocyanate, the cores produced from the freshly prepared sand mixture also harden after 10 seconds. Their flexural strength is 30 kp/cm². However, after the sand mixture has been stored for 2 hours, the strength of the cores falls to 18 kp/cm² and, after 4 hours' storage, to 8 kp/cm². After 8 hours' storage, the mixture loses its fluidity and agglomerates, so that it is not possible to produce any more cores. After 24 hours, the sand mixture has completely hardened in the storage vessel.

EXAMPLE 2

100 parts by weight of a polyester resin obtained by high-temperature esterification from trimethylol propane and phthalic acid anhydride in a molar ratio of 7:6, having an OH-number of 9.1% an average molecular weight of 1500 and a softening point of 95° C are dissolved in 50 parts by weight of butyl acetate.

75 parts by weight of 4,4'-diisocyanato-3,3'-dimethyl diphenyl methane are dissolved in 40 parts by weight of butyl acetate. Both solutions are combined and mixed with 20,000 parts by weight of the foundry sand described in Example 1. The mixture is further treated by the same procedure as in Example 1.

The fresh sand mixture is found to have a hardening time of 30 seconds. The flexural strength of the sand core is 24 kp/cm².

After storage for 2 days, the sand mixture has lost none of its fluidity. Its hardening time stays the same at 30 seconds, and the flexural strength of the sand core is 22 kp/cm².

When the procedure described above is repeated with 68 parts by weight of 4,4'-diisocyanatodiphenyl methane having an NCO-content of 33.7% instead of 75 parts by weight of the above-mentioned diisocyanate, the freshly prepared sand mixture is found to have a hardening time of 30 seconds while the flexural strength of the cores amounts to 23 kp/cm². After storage for 2 hours, the sand mixture loses its fluidity so that it is no longer possible to produce satisfactory cores.

EXAMPLE 3

100 parts by weight of a phenol resin produced by heat-catalyzed condensation from phenol and paraformaldehyde in a ratio by weight of 10:7 in the presence of 1% of zinc naphthenate, having an OH-number of 15% and an average molecular weight of 600, are dissolved in 50 parts by weight of tetrahydrofuran.

140 parts by weight of a polyisocyanate produced from 2-ethyl aniline and formaldehyde by acid condensation, followed by phosgenation, having an NCO-content of 27% and an average molecular weight of 470 are dissolved in 70 parts by weight of xylene. Both solutions are combined and mixed with 25,000 parts by weight of the foundry sand described in Example 1. The mixture is further treated by the same procedure as in Example 1.

The fresh sand mixture is found to have a hardening time of 8 seconds. The flexural strength of the sand core is 28 kp/cm².

After storage for 5 days, the sand mixture loses none of its fluidity. The hardening time remains the same at 8 seconds, while the flexural strength of the sand cores is 26 kp/cm².

What is claimed is:

1. In a process for the production of foundry cores and molds wherein a mixture of inert fillers, polyhydroxyl compounds, polyisocyanates and tertiary amines is cured in a mold, the improvement wherein at least 80% by weight of the polyisocyanate component used consists of polyisocyanates of the diphenyl alkane series which solely contain isocyanate groups sterically hindered by substituents in at least one ortho position.

2. The process of claim 1 wherein at least 90% of said sterically hindered polyisocyanate is used.

3. The process of claim 1 wherein said sterically hindered polyisocyanate is 4,4'-diisocyanato-3,3'-dimethyl diphenyl methane.

4. The process of claim 1 wherein said polyhydroxyl compound is a phenol resin containing hydroxyl groups.

5. The process of claim 1 wherein said inert filler is foundry sand.

6. The process of claim 1 wherein the NCO/OH ratio is between 2:1 and 1:2.

7. The process of claim 1 wherein the NCO/OH ratio is 1:1.

8. The process of claim 1 wherein said polyisocyanate is

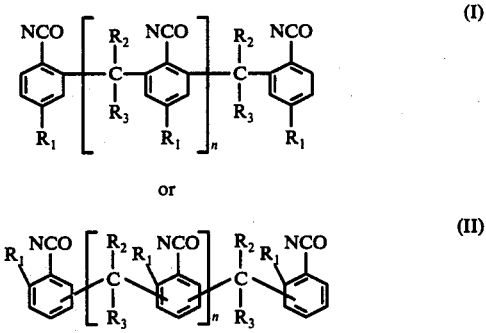

where
$R_1$ represents an aliphatic hydrocarbon radical having from 1 to 4 carbon atoms,
$R_2$ and $R_3$ are the same or different and represent hydrogen or the radical $R_1$, and
$n$ is 0 or an integer from 1 to 8.

9. The process of claim 8 wherein $R_1$ = methyl, $R_2$ and $R_3$ = hydrogen and $n$ = 0.

10. The process of claim 8 wherein $n$ is an integer of from 1 to 3.

* * * * *